March 19, 1957 R. E. HARRINGTON 2,785,549
SAFETY SHIELDED POWER-TRANSMITTING ASSEMBLY
Filed Jan. 20, 1955
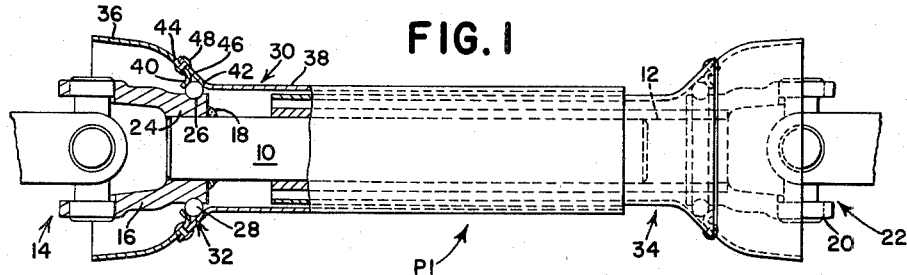
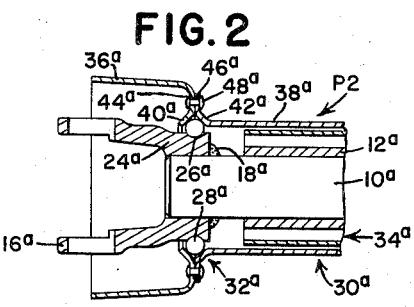
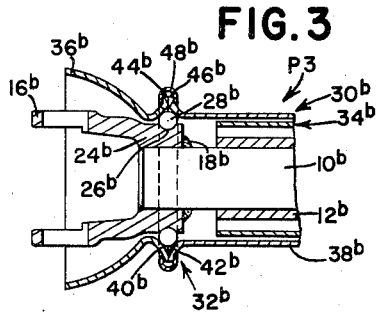
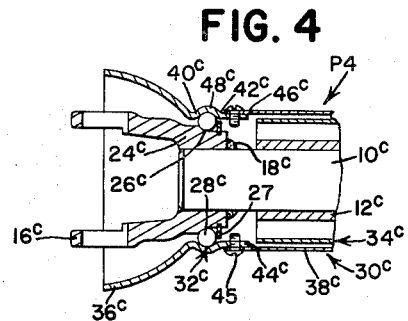
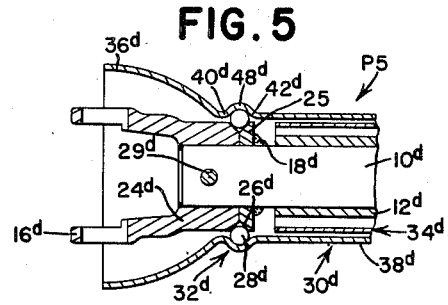
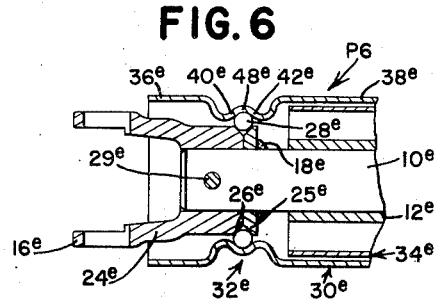
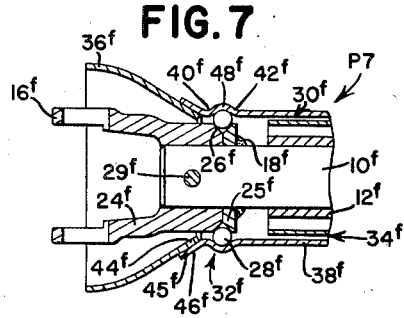
*INVENTOR.*
R. E. HARRINGTON United States Patent Office 2,785,549
Patented Mar. 19, 1957

2,785,549

SAFETY SHIELDED POWER-TRANSMITTING ASSEMBLY

Roy E. Harrington, Moline, Ill., assignor to Deere & Company, Moline, Ill., a corporation of Illinois Application January 20, 1955, Serial No. 483,016

3 Claims. (Cl. 64—4)

This invention relates to safety shielding for power-transmitting assemblies and particularly to such shielding for use in propeller shafts as used in the connection of agricultural implements to tractors.

An agricultural tractor is conventionally equipped with a rearwardly projecting power take-off shaft from which power is taken by a propeller shaft to an implement mounted on or towed and powered by the tractor. It has been long recognized that the exposed propeller shaft is a hazard to the operator and various types of safety shields have been developed for use in protecting the operator against these hazards. There are, however, various design characteristics that hamper somewhat the development of a suitable shield for use in all cases. For example, when the implement is connected to or disconnected from the tractor it is necessary to connect and disconnect the propeller shaft relative to the power take-off shaft. If the shield is permanently attached in such a manner as to interfere with the manipulation of the various connections, then the operator is apt to discard the shield. If the shield is made too easily removable, the operator is likely to forget to reinstall it and the hazard is recreated. In some instances shielding has been provided that bridges the gap between the tongue of the towed implement and the tractor, but in these cases the shield must be articulate as well as at least partially removable to accommodate the articulate connection between the tractor and the implement and to facilitate connection and disconnection of the tongue and power shaft.

It has been a characteristic of recent designs to provide a shield that is carried directly on the intermediate portion of the power shaft in such manner that the shield is journaled on the shaft. Normally, the friction between the shield and the shaft will cause the shield to rotate but if the operator should inadvertently contact the shield, it cannot rotate and therefore cannot wrap into his clothing or otherwise injure him. Shields of this character have proven fairly desirable to both the manufacturer and the user, but a few minor problems remain to be solved; namely, provision for relative permanence of the shield but including also provision for removing the shield in the event that it is desired to service or replace any or all of the parts because of wear or damage; and various problems incident to economical manufacture and ease of maintenance.

The present invention features a pair of telescopically interconnected shafts having at opposite or remote ends thereof, respectively, means for journaling on the assembly a pair of telescopically related tubes, whereby one tube is carried exclusively by one of the shafts. The mounting of the tube on its respective shaft is accomplished by a bearing means providing for both radial-load and thrust-load contact, the shaft and its tube being thereby interjournaled and also restrained against relative axial displacement. Because the load conditions on the bearings are not heavy, the bearings may be inexpensively constructed and may utilize raceways formed in means on the shaft and in means on the tube. In the case of the latter raceway, the tube, being preferably of sheet metal, has annular lip portions thereof displaced generally radially away and cooperative in such manner as to define the raceway or groove. The end of the shaft may be equipped with a universal joint yoke member or equivalent coupling means and this member or means may have thereon a collar including a cooperating groove in which a plurality of rolling elements such as balls may be mounted.

The invention further features a plurality of designs having the characteristics of simplicity and economy.

The foregoing and other important objects and desirable features inherent in and encompassed by the invention will become apparent to those skilled in the art as several preferred embodiments of the invention are disclosed in detail in the following specification and accompanying sheet of drawings, the several figures of which will be described immediately below.

Fig. 1 is an elevational view, partly in section, showing one form of power-transmitting assembly.

Fig. 2 is a sectional view of one end portion of a modified form of assembly.

Figs. 3, 4, 5, 6, and 7 are respectively sectional views of further modified forms.

In the typical situation in which the power-transmitting assembly finds greatest utility, an agricultural tractor is drawbar-connected to a trailing implement or has an implement directly mounted thereon and in either case the power take-off shaft of the tractor is connected to an implement input shaft by a power-transmitting assembly of which any of the forms here may be taken as representative. Because of the articulate interconnection at the drawbar, the power shaft assembly includes universal joints of the Cardan type. The propeller shaft between the universal joints is the one that requires the safety shielding, because the input shaft on the implement may be permanently shielded and the power take-off shaft on the tractor may be equipped with a shield of the type shown in the patent to Tinsler et al. 2,413,266.

The safety-shielded, power-transmitting assembly of Fig. 1 is designated in its entirety by the reference character P¹ and is shown as including first and second telescopically interconnected shafts 10 and 12, the former being solid and the latter being hollow and the two having cooperating squared or splined sections to accomplish rotation thereof in unison while permitting axial movement. The shaft 10 has at its remote end portion a universal joint 14, one yoke of which, at 16, is fixed to the shaft as by welding at 18. The hollow or other shaft 12 has fixed thereto a yoke 20 of a second universal joint 22. Thus, by means of the universal joints 14 and 22, the shaft assembly is equipped with means adapting it to be connected into a power shafting line such as that between the power take-off shaft of a tractor and the input shaft of an associated implement.

The yoke 16 has an integral hub or collar portion 24 about the external cylindrical surface of which is formed a concentric external bearing raceway or groove 26 within which is carried a plurality or circle of rolling elements such as balls 28 to establish bearing means for journaling on the shaft 10 a front safety tube 30. This tube has means, designated generally by the numeral 32, affording an internal bearing raceway or groove which rides on or receives the circle of rolling elements 28, the bearing means thus afforded having the characteristics of both radial-load and bi-directional thrust-load contact between the parts so that the tube 30 is not only journaled on the shaft but is also restrained against axial displacement relative to the shaft.

A similar relationship exists between a rear tube 34 that is concentric about the shaft 10 and that is telescopically related to the front tube 30. As will be clear without further description, the rear end of the rear tube 34 is journaled on the collar of the yoke 20 of the rear universal joint 22 and the characteristics of the bearing are the same as those at 26—28—32. Thus, each tube 30 and 34 is carried exclusively by its own shaft and yoke unit 10—16 and 12—20. As will appear in greater detail below, each tube is normally non-removable as respects its associated shaft and yoke unit. Nevertheless, because of the telescopic relationship between the two shaft and yoke units, changes in the length of the assembly are readily accommodated. Because of friction between the tubes and the associated shaft and yoke units, the tubes are likely to rotate normally with rotation of the shaft but in the event that a person engages the tubes, rotation thereof will cease and the person will not be injured.

The tube 30 is made up of first and second coaxial sections 36 and 38, the first of which is enlarged or generally bell-shaped to accommodate the universal joint 14 and the other of which is of smaller diameter to encircle the shaft 10 and the associated portion of the other tube 34. The raceway means 32 includes first and second axially spaced apart and rigidly interjoined annular portions or lips 40 and 42, respectively, integrally joined with the tube sections 36 and 38.

The race ring portions or lips 40 and 42 include, in this form of the invention, overlapping parts 44 and 46, respectively, which are provided with a plurality of sets of apertures in each set of which is received a removable fastening means 48. Since the annular or peripheral wall of the tube section 38 is of a diameter smaller than the diameter of a circle that includes the outer portions of the balls 28, the lip 42 is turned generally radially outwardly and forwardly. The other section 36, being of larger diameter, has its lip or flange 40 turned radially inwardly. As already indicated, the parts overlap at 44—46 and are secured together at 48. The fasteners 48 are normally permanently operative but may be deliberately destroyed to permit separation of the sections 36 and 38 in the event that it is necessary to replace one of these parts or in the further event that the tube sections are satisfactory but a portion of the shaft unit requires replacement. Moreover, the separability at 48 includes also the juxtaposing of the parts and the securing thereof as a means for facilitating assembly of the bearing means in the raceway 32 and cooperating race groove 26. Because of the shape of the raceway 32, the existence of both radial-load and bi-directional thrust-load contact establishes both the journaling and anti-axial displacement relationship.

Characteristics of the structure just described will be observed in repetition at the other end of the assembly P¹ and it is deemed unnecessary to elaborate. Suffice it to say that, as previously indicated, the tube sections 30 and 34 are respectively journaled and axially restrained respectively on their own shaft and yoke units and are normally non-removable during operation, thus having the desirable characteristics of economy, safety, simplicity, and ease of replacement.

In Fig. 2, an assembly P² is shown as having a front end construction similar to the front end construction previously described. The same reference characters bearing the exponent "a" are used. It is deemed that the equivalent parts will be readily recognized and therefore only a brief description is necessary. As will be seen, the shaft 10a, telescopically received within the other shaft 12a, is equipped at one end with a universal joint or coupling member 16a and the unit 10a—16a is thus concentrically encircled by the tube 30a. This tube is made up of the first and second sections 36a and 38a, rigidly interjoined at 48a by annular portions or parts 44a and 46a of raceway-forming lips or flanges 40a and 42a, these portions establishing the raceway 32a for the rolling elements or balls 28a. The bearing means is completed by the groove 26a in the collar 24a on the joint member 16a. The joint member is secured to the shaft 10a by welding at 18a. A portion of the other tube 34a is illustrated to show its relationship to the front tube 30a.

The portion of the assembly P³ illustrated in Fig. 3 shows that it has the same general characteristics of the assemblies P¹ and P². Corresponding parts among the figures have again been illustrated and designated on the basis of the use of the same reference characters but in this case supplemented by the exponent "b." These parts will be recognized without further description, except as to those in which essential differences exist, as is the case of the lip parts 44b and 46b, which are here shown as being juxtaposed to establish a double-thickness annular rib on the tube 30b. The securing means, instead of comprising fasteners in the form of rivets 48 or 48a, is an annular member in the form of a ring 48b of channel-shaped internal section so as to marginally embrace the double-thickness rib 44b—46b.

The assembly portion at P⁴ in Fig. 4 resembles somewhat those previously described. The similar reference characters, to which has been added in each case the exponent "c," will make obvious the equivalency of the corresponding parts. Hence, description will be devoted only to the differences that will facilitate a clear understanding of the structure. For example, the collar or sleeve portion 24c of the universal joint yoke 16c has its bearing groove 26c formed by a portion of the sleeve and in part by an associated snap ring 27. Moreover, the race ring lips 40c and 42c are integrally interjoined at 48c by an integral part of the tube section 36c, which section is joined to the tube section 38c adjacent to but rearwardly of the bearing at 28c, the securing means comprising overlapping parts 44c and 46c, respectively, of the tube sections 36c and 38c and fasteners in the form of self-threading screws 45.

The assembly or unit P⁵ shown in Fig. 5 features the integral raceway, as at 32d, similar to the integral raceway 32c of the assembly P⁴. Reference characters previously used but having the exponent "d" will be employed in the description of Fig. 5. However, specific description will be avoided except to the extent that the structure has esssential differences. For example, the raceway 26d in the assembly P⁵ is formed in part of the sleeve 24d on the universal joint yoke 16d and in part by a ring 25 welded at 18d to the shaft 10d. The universal joint yoke 16d is removable from the end of the shaft 10d by means of removing a pin 29 through an appropriate transverse registering aperture (not shown) in the yoke-member-encircling tube section 36d. The tube 30d is made up of integral and not separate sections 36d and 38d.

The assembly P⁶ of Fig. 6 is another version of the assembly P⁵ of Fig. 5. It is deemed that the application of reference characters, to which has been added in each case the suffix "e" will suffice without further description.

The assembly P⁷ partakes in part of the characteristics of the assemblies P⁵ and P⁶ as well as those of the assembly P⁴. Again, the reference character pattern, this time using the suffix "f" will be employed, by means of which the structure in a large part may be readily understood. It will be noted, as in the case of the assembly P⁴, that the raceway means 32f is integral with one of the tube sections, in this case with the tube section 38f. Rigid interjoining of the tube sections 36f and 38f is preferably accomplished by spot welding or the like at 45f between the parts 44f and 46f of the tube sections.

In all instances, the journaling of the associated tube is accomplished by means of a raceway formed in part in the tube and in part in the collar of the associated yoke or joint member. In some cases, the tube section is of two pieces, interjoined to establish the raceway. In other cases, the junction between the two pieces is adjacent to but spaced axially from the bearing means. However, in all cases, the interjournaling between the shaft and yoke unit and its associated tube part is such as to include the anti-axial-shifting relationship as well as the radial-load contact relationship. As will be seen, the sheet metal structure of the tube, whether it be formed of one or two or more parts, is in the interests of economy and the structure possesses sufficient safety requirements for the purpose intended.

Features of the invention not categorically enumerated will undoubtedly occur to those versed in the art, as will modifications in the preferred embodiments of the invention illustrated, all of which may be achieved without departing from the spirit and scope of the invention.

What is claimed is:

1. In a safety-shielded power-transmitting assembly comprising a shaft, means concentrically on said shaft and affording an annular inner bearing raceway, bearing means in said raceway, and a safety tube loosely encircling the shaft and bearing means characterized in that said tube includes a pair of coaxial tube sections axially separably arranged in end-to-end relationship and meeting at an annular junction substantially in radial register with and encircling the bearing means, said sections respectively having separate annular lips flared relative to the respective tube sections in radially outwardly converging relationship to afford an outer raceway concentric with and receiving the bearing means to journal the tube on the shaft, said lips respectively having securing portions thereon, and releasable securing means secures said portions together to confine the bearing means to said raceways and to hold the tube against axial displacement relative to the shaft, said securing means being releasable to enable axial separation of the tube sections at said junction for effecting release of the bearing means from said outer raceway and consequently to enable axial removal of the tube section from the shaft.

2. The invention defined in claim 1, in which: one tube section is elongated and cylindrical and its lip flares radially outwardly, and the other tube section is bell-shaped and of larger diameter than said one tube section and its lip flares radially inwardly.

3. The invention defined in claim 1, in which: the securing portions on the lips extend radially outwardly of said outer raceway in side-by-side relationship, and a channel shaped ring encircles and receives said portions, said ring being split to enable removal thereof for axial separation of the tube sections.

References Cited in the file of this patent

UNITED STATES PATENTS

| 1,024,132 | Heaslet | Apr. 23, 1912 |

FOREIGN PATENTS

| 22,667 | Great Britain | Oct. 28, 1898 |
| 23,051 | Great Britain | Oct. 18, 1906 |